Figure 1:
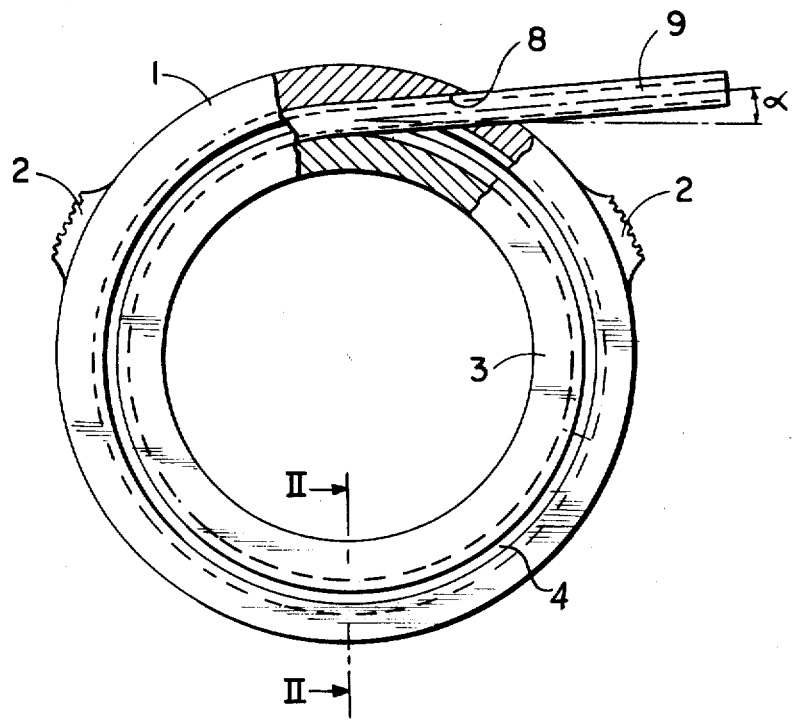

United States Patent
Dahlgren

[15] 3,698,773
[45] Oct. 17, 1972

[54] BEARINGS FOR PRECISION APPARATUS

[72] Inventor: Lennart Gunnar Oskar Dahlgren, Vastra Frolunda, Sweden

[73] Assignee: Fritz Victor Hasselblad, Goteborg, Sweden

[22] Filed: Dec. 10, 1969

[21] Appl. No.: 883,746

[30] Foreign Application Priority Data

April 29, 1969 Sweden .................. 6139/69

[52] U.S. Cl. ............................... 308/8, 95/53
[51] Int. Cl. ....................... F16c 17/00, F16c 27/06
[58] Field of Search ......... 308/238, 239, 237, DIG. 7, 308/36, 37, DIG. 4; 285/276; 95/53

[56] References Cited

UNITED STATES PATENTS

| | | | |
|---|---|---|---|
| 2,704,230 | 3/1955 | Röschlaú | 308/8 |
| 1,329,760 | 2/1920 | Fulton | 285/276 |
| 3,086,826 | 4/1963 | Gunnell | 308/37 |
| 3,296,950 | 1/1967 | Starp | 95/53 |
| 3,302,988 | 2/1967 | Senter | 308/238 |

FOREIGN PATENTS OR APPLICATIONS

| | | | |
|---|---|---|---|
| 1,368,975 | 6/1964 | France | 308/8 |
| 389,393 | 7/1965 | Switzerland | 95/53 |
| 444,153 | 6/1924 | Germany | |

*Primary Examiner*—Martin P. Schwadron
*Assistant Examiner*—Barry Grossman
*Attorney*—McGlew & Toren

[57] ABSTRACT

A bearing of the type which comprises an outer ring and an inner ring mounted for rotation one within the other, wherein the confronting edge portions of the rings are provided with grooves to form a channel therebetween, into which is inserted a hose of resilient material having a low coefficient of friction, the diameter of the hose being such that the hose is slightly deformed when entering the channel, to form bearing surfaces against the sides of the grooves.

3 Claims, 2 Drawing Figures

PATENTED OCT 17 1972  3,698,773

*INVENTOR*
Lennart Gunnar Oskar Dahlgren by
McGlew & Toren
ATTORNEYS

BEARINGS FOR PRECISION APPARATUS

The present invention relates to bearings of the type which comprise an outer and an inner ring and which are mounted for rotation one within the other and when desired are intermittently moved angularly in relation to each other, and which require that the said relative movement is accomplished particularly gently and smoothly but nevertheless with a slight clearance at the loads placed on the bearings at the time, as is the case, for example, with the lens elements of cameras. When considered suitable, however, one or both of the bearing rings can be replaced with bearing surfaces formed integral with the structural elements of the apparatus. Typical examples of this type of bearing are shutter speed selection rings and aperture selection rings for cameras, as mentioned above. Slide bearings and roller bearings are both used for the aforementioned purpose. The slide bearings give rise to a relatively large amount of friction and often require lubrication to ensure correct functioning. This is a disadvantage, since the lubricant tends to dry out with time or coagulate, as a result of dust collection for example. The lubricant also thickens in cold conditions, which renders use of the camera outdoors, for instance, in conditions of extreme cold difficult or impossible. Roller bearings, normally ball races, are able to function satisfactorily without a lubricant but are expensive and readily obtain a tendency to move harshly and unevenly. Since the roller bodies are made of a hard material, normally hardened steel, and the bearing surfaces are often made of a much softer material, for example aluminum or brass, the clearance between the bearings becomes too large when it has been in use for some time.

One object of the present invention is therefore to provide a bearing structure which eliminates the aforementioned disadvantages and which permits ease of manufacture and assembly of the bearing. The bearing is, in principle, constructed so as to leave a gap between the outer and inner ring, where the inside of the outer ring and the outside of the inner ring present confronting grooves of V-shaped or trapezoidal cross section so as to form a channel therebetween in which a hose is inserted, through a bore drilled, for example, obliquely through the outer ring, the external diameter of the hose being slightly greater than the diameter of the circle inscribed in the channel, and the length of the hose being equal to or slightly shorter than the length of the channel.

The hose, which comprises a resilient material having a low coefficient of friction, for example fluoroethylene or chlorotrifluoroethylene is slightly deformed when inserted into the channel and moulds to the walls thereof, whereby a desired, slightly resilient bearing is obtained with practically no clearance. The low frictional coefficient of the hose enables the bearing to move smoothly and freely without a lubricant. By suitably adapting the size and shape of the channel and the outer diameter and wall thickness of the hose in relation to each other, the bearing can be varied within wide limits with respect to its bearing or carrying strength, degree of resiliency and requisite torque for relative movement of the bearing rings. When necessary, the bearing can be provided with two or more channels arranged in juxtaposed relationship and each receiving its respective hose.

Figure 2:
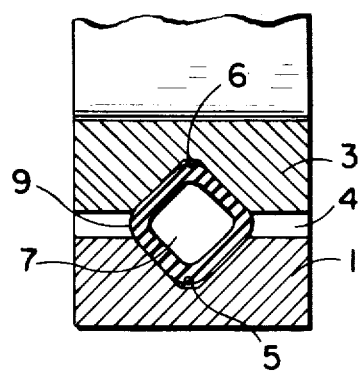

A selected, suitable embodiment of the invention is illustrated in the accompanying drawing, of which:

FIG. 1 is a front view of the bearing, partly cut away and showing the hose partially inserted in the channel, and FIG. 2 is a radial section through the bearing, taken along the line II—II in FIG. 1.

For illustrative purposes the thickness of the bearing rings and the size of the channel have been strongly exaggerated in the drawing.

In the drawing there is shown an outer ring 1 rotatably mounted on a fixed inner ring 3 and having a grip 2 for manually adjusting the position of said ring 1. The outer ring 1 and the inner ring 3 are separated by a gap 4 and present opposing trapezoidal, finely machined grooves 5 and 6 respectively, which together form a channel 7 which is open at the sides, towards the gap 4. Inserted through a bore 8, which passes obliquely through the outer ring 1 towards the center of channel 7 is a hose 9, made of a resilient material having a low coefficient of friction, the hose 9 having an outer diameter which is slightly larger than the diameter of the circle which can be inscribed in the channel 7, and the length of which is equal to or slightly less than the length of said channel. When the hose 9 is inserted in the channel 7 it is slightly deformed and forms bearings surfaces against grooves 5 and 6, as illustrated in FIG. 2. The center line of the bore 8 suitably forms a small angle $\alpha$ with the tangent through the center of channel 7 (see FIG. 1), to prevent the hose 9 from being unintentionally passed out through the bore 8 when the outer ring 1 is rotated relative to the inner ring 3.

The invention is not restricted to the embodiment described and illustrated in the drawing, but can be modified within the scope of the invention idea. For instance, the shape of the grooves in the bearing rings, the number of grooves and the cross-sectional shape of the hose can be varied. Similarly, one or both of the bearing rings can be replaced by corresponding bearing surfaces produced by machining parts of the structure of which the bearing forms part. When considered expedient for reasons of construction, the hose may also be introduced into the passage through a bore disposed in the inner ring.

What is claimed is:

1. A bearing for the shutter speed selection rings on camera lenses and the like, comprising an inner ring, an outer ring mounted concentrically around said inner ring, said inner ring and outer ring arranged for relative rotational movement therebetween, wherein the improvement comprises that the radially inner periphery of said outer ring is spaced radially outwardly from the radially outer periphery of said inner ring and forms an annular-shaped gap therebetween, the radially inner periphery of said outer ring having an annular-shaped inwardly facing groove formed therein communicating with and extending radially outwardly from said gap, the radially outer periphery of said inner ring having an annular-shaped outwardly facing groove located opposite the groove in said outer ring and communicating with and extending radially inwardly from said gap, the grooves in said outer and inner rings each having a generally V-shaped configuration in a radial plane with the sides of the grooves diverging toward the gap between said grooves, said grooves and the gap therebetween forming an annular channel, a length of hose formed of a resilient material having a low coefficient of friction positioned within the annular channel formed between said inner ring and said outer ring, the length of said channel is at least equal to the length of said hose, said hose having a greater transverse dimension than that of a circle inscribed within the channel formed by the grooves in said outer and inner rings and the gap therebetween so that said hose is in slightly deformed shape when inserted into the channel and is in bearing engagement with at least a portion of the surfaces of the grooves formed within said inner and outer rings.

2. A bearing, as set forth in claim 1, wherein one of said inner ring and said outer ring having a bore extending therethrough and opening into the channel formed between the grooves in said inner and outer ring for introducing the length of said hose into the channel.

3. A bearing, as set forth in claim 2, characterized in that the axis of the bore opening into the channel forms a small angle with the tangent to the center line of the channel for preventing the hose from unintentionally passing outwardly through the bore formed in one of said inner and outer rings when said inner and outer rings are rotated relative to one another.

* * * * *